(12) United States Patent
Johnson et al.

(10) Patent No.: US 12,438,620 B2
(45) Date of Patent: Oct. 7, 2025

(54) LASER WITH OPTICAL SIGNAL MANAGEMENT CAPABILITY

(71) Applicant: AVAGO TECHNOLOGIES INTERNATIONAL SALES PTE. LIMITED, Singapore (SG)

(72) Inventors: John Evan Johnson, Schnecksville, PA (US); Near Margalit, Westlake Village, CA (US); David John Kenneth Meadowcroft, Framlingham (GB)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 325 days.

(21) Appl. No.: 17/977,382

(22) Filed: Oct. 31, 2022

(65) Prior Publication Data

US 2024/0146418 A1    May 2, 2024

(51) Int. Cl.
*H04B 10/50*    (2013.01)
*H04B 10/27*    (2013.01)

(52) U.S. Cl.
CPC .......... *H04B 10/503* (2013.01); *H04B 10/27* (2013.01)

(58) Field of Classification Search
CPC ................ H04B 10/503; H04B 1/27
See application file for complete search history.

(56) References Cited

U.S. PATENT DOCUMENTS

| 10,601,513 B2 | 3/2020 | Campos |
| 10,826,613 B1 | 11/2020 | Liang et al. |
| 2005/0191056 A1* | 9/2005 | Coffey ............... H04J 14/02 398/79 |
| 2017/0346445 A1 | 11/2017 | Shen et al. |
| 2020/0328815 A1 | 10/2020 | Li et al. |

FOREIGN PATENT DOCUMENTS

CA    2319905 A1 *    8/2001    .............. H04J 14/02

OTHER PUBLICATIONS

U.S. Appl. No. 17/895,680, filed Aug. 25, 2022.
Minkenberg C, Krishnaswamy R, Zilkie A, Nelson D. Co-packaged datacenter optics: Opportunities and challenges. IET Optoelectron. 2021;15:77-91. https://doi.org/10.1049/ote2.12020.
Moyer, B. (Dec. 9, 2021). Will co-packaged optics replace pluggables? Semiconductor Engineering. Retrieved Oct. 28, 2022, from https://semiengineering.com/will-co-packaged-optics-replace-pluggables/.

* cited by examiner

*Primary Examiner* — Brenda H Pham
(74) *Attorney, Agent, or Firm* — Foley & Lardner LLP (57) ABSTRACT

A laser module can include one or more lasers, an optical I/O interface, an optical receive interface, an optical transmit interface, a first optical device, and a second optical device. The first optical device is disposed between the optical I/O interface and the optical transmit interface, and the second optical device is disposed between the optical I/O interface and the optical receive interface.

20 Claims, 6 Drawing Sheets

LASER WITH OPTICAL SIGNAL MANAGEMENT CAPABILITY

FIELD OF THE DISCLOSURE

This disclosure generally relates to systems for and methods of providing light, such as, light for use in the transmission of data. Some embodiments in this disclosure relate to systems for and methods of providing light in a number of formats for optical communication.

BACKGROUND OF THE DISCLOSURE

Light sources, such as lasers, are used to provide optical signals for the transmission of data. For example, data centers can use server, leaf, spine, router and transport switches that include optical interface devices which receive light produced by one or more lasers. The light is often provided as a continuous wave (CW) (e.g., non-pulsed) at a particular input power. The switches can be provided as co-packaged optical interface (CPO) devices which include an application specific integrated circuit (ASIC) for processing electronic signals integrated with an optical interface device for receiving and providing optical signals associated with the electronic signals. The optical interface device generally includes optical wavelengths in a fixed configuration. The fixed configuration cannot be changed by the end user without replacing the entire co-packaged optical interface device.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

Below are detailed descriptions of various concepts related to, and embodiments of, techniques, approaches, methods, apparatuses, and systems for processing optical data. Some embodiments of systems and methods advantageously allow the end user to procure generic CPO-enabled switches and to configure and manage the optical interface devices of the switches at the point of use. In some embodiments, the systems and methods utilize a remote laser module (RLM) that includes a pass through optical circuit that can accommodate different numbers of wavelengths, wavelength grids and optical powers. In some embodiments, the RLM is not a simple, fixed CW laser source that matches a single specific format of the optical interface device which can be a silicon photonics (SiPh) engine (SiPhE) including a SiPh photonic integrated circuit (PIC). In some embodiments, the RLM includes receive and transmit optical multiplexers with optical pass through (OPT) capability for providing light according to various configurations (e.g., single-wavelength per fiber, M fibers carrying P wavelengths, etc.), where M, N, and P are integers. In some embodiments, the RLM provides OPT capability without multiplexers or demultiplexers. In some embodiments, N is the number of transmit channels and the number of receive channels, M is the number of input/output (I/O) fibers (e.g., fibers at the external I/O of the RLM), and P is the number of wavelengths per external I/O fiber.

In some embodiments, the SiPH PIC includes a power splitting device (e.g., a programmable optical switch or optical split network) for the laser light received from the RLM. The power splitting device has a power splitting ratio R. For a SiPh PIC with fixed power split ratio, R, the maximum number of wavelengths Pmax is equal to N/R which is the same as the number of CW laser fibers connecting the RLM and the PIC in some embodiments. For a SiPh PIC with a non-fixed power split ratio, R, the maximum number of wavelengths Pmax is extended beyond the value N/R to N in some embodiments. Other configurations are possible where the maximum number of wavelengths is increased. In some embodiments, the lasers and the optical multiplexers and demultiplexers in the RLM can be changed to achieve different wavelength grids and/or optical powers and still use the same SiPhE. In some embodiments, the RLM is pluggable so that RLMs can be removed and replaced to change wavelength grids and/or optical powers without changing the optical interface device.

The power splitting device is a two by two Mach-Zehnder switch in some embodiments. The power splitting device advantageously increases the number of available wavelength division multiplexing (WDM) channels, thereby providing advantages over systems where the number of fibers and wavelengths is determined by the configuration of fixed optical multiplexers and demultiplexers on the SiPh PIC.

The various concepts introduced above and discussed in detail below can be implemented in any of numerous ways, as the described concepts are not limited to any particular manner of implementation. Examples of specific embodiments and applications are provided primarily for illustrative purposes. In the following description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Similarly, when an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present. Couple or coupling can refer to electrical, mechanical or optical couple or coupling. Optically coupled or coupling may refer to coupling using optical components for optical communication.

Furthermore, the methods and processes discussed herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth used should be understood as being a modifiable. In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Some embodiments relate to a laser module. The laser module includes one or more lasers, an optical I/O interface, an optical receive interface, an optical transmit interface, one or more first optical devices and one or more second optical demultiplexer. The optical multiplexer is disposed between the optical I/O interface and the optical transmit interface, and the optical demultiplexer disposed between the optical I/O interface and the optical receive interface. An optical device may refer to a multiplexer, demultiplexer, or other passive or active optical devices. Passive optical devices include power splitters, fixed attenuators, dispersion compensators, isolators, etc. and active optical devices including optical amplifiers, VOAs, optical switches, OEO transponder, etc.

Some embodiments relate to a laser module. The laser module includes one or more lasers, an optical I/O interface, an optical receive interface, an optical transmit interface, an optical multiplexer and an optical demultiplexer. The optical multiplexer is disposed between the optical I/O interface and the optical transmit interface, and the optical demultiplexer disposed between the optical I/O interface and the optical receive interface.

As used herein an optical multiplexer may be any device that that brings optical signals together at an input for transporting the signals over fewer fibers at the output and an optical demultiplexer may be any device that separates optical signals at an input for provision on more fibers at an output. Fibers may refer to any optical medium suitable for communicating optical signals. Optical fibers can be part of one or more fiber optic cables including cables having multicore or single core optical fibers. As used here in, an optical interface refers to any interface for coupling to fibers that carry optical signals. As used here in, an optical I/O interface may refer to an optical interface for coupling to a device such as a remote switch. As used here in, an optical receive interface may refer to an optical interface for coupling to fibers that provide optical signals to a local optical interface device including but not limited to an optical interface device co-packaged with a local switch. As used here in, an optical transmit interface may refer to an optical interface for coupling to fibers that receive optical signals from a local optical interface device including but not limited to an optical interface device co-packaged with a local switch. As used here in, an optical laser interface may refer to an optical interface for coupling to fibers that provide optical signals from a laser device to a local optical interface device including but not limited to an optical interface device co-packaged with a local switch. As used herein, the terms local and remote when used with the terms device or module refer to separate devices where the distance between the local and remote device can be any distance (e.g., from very large distance to a very short distance). In some embodiments, local and remote devices can be in the same room, on the same rack, or attached to each other. As used herein, optical signals may refer to any type of light signals including but not limited to modulated light signals, unmodulated light signals, signals used in fiber optic communication, signals provided on optical mediums, etc.

In some embodiments, the laser module includes a controller coupled to at least one laser. In some embodiments, the controller provides data indicating a configuration of the one or more lasers via an electronic bus. A controller may refer to any electronic device that processes data. In some embodiments, the controller controls operations of a device or configures a device.

In some embodiments, a number of the lasers is less than a number of optical fibers associated with the optical transmit interface. In some embodiments, the optical demultiplexer is disposed on a planar integrated circuit. A planar integrated circuit may refer to any circuit that has been manufactured using any integrated circuit planar fabrication process to achieve one or more three-dimensional (3D) structures.

In some embodiments, the optical I/O interface is a pluggable interface. In some embodiments, the optical receive interface and the optical transmit interface are pluggable interfaces. In some embodiments, the optical receive interface and the optical transmit interface are configured for attachment to a single connector.

Some embodiments relate to a system including a laser module and an optical interface device. The laser module includes an optical I/O interface, a first optical interface, a second optical interface, an optical multiplexer, and an optical demultiplexer. The optical multiplexer is disposed between the optical I/O interface and the first optical interface, and the optical demultiplexer disposed between the optical I/O interface and the second optical interface. The optical interface device is configured to be optically coupled with the laser module. The optical interface device provides first optical signals on a number N of first fibers coupled to the first optical interface, and the laser module provides the first optical signals to the optical I/O interface on a number M of second fibers. The number M is less than the number N.

Some embodiments relate to a system including a laser module and an optical interface device. The laser module includes an optical I/O interface, a first optical interface, a second optical interface, an optical multiplexer disposed between the optical I/O interface and the first optical interface, and an optical demultiplexer disposed between the optical I/O interface and the second optical interface. The optical interface device is configured to be optically coupled with the laser module. The optical interface device is configured to provide first optical signals on first fibers coupled to the first optical interface and the laser module is configured to provide the first optical signals to the optical I/O interface using the optical multiplexer. The laser module is configured to provide second optical signals received from the optical I/O interface to second fibers coupled to the second optical interface using the optical demultiplexer.

In some embodiments, the laser module provides second optical signals on the number N of third fibers coupled to the second optical interface and the laser module receives the second optical signals on the optical I/O interface. In some embodiments, the optical interface device is a Silicon Photonics (SiPh) optical engine. In some embodiments, the optical interface device includes a splitting device, and the laser module includes a laser interface and at least one laser. A number Q of third fibers are coupled between the splitting device and the laser module. The number Q is a number of the at least one laser disposed in the laser module.

In some embodiments, the splitting device splits laser signals provided on the Q third fibers for provision on the number N of the first fibers. A number R is a splitting ratio of the splitting device, where Q=N/R. In some embodiments, the optical interface device includes a splitting device and the laser module includes a laser interface and at least one laser. Third fibers are coupled between the splitting device and the laser module. The splitting device is configured to split the laser signals on the third fibers by a splitting ratio. The splitting ratio is a variable integer. In some embodiments, the splitting device includes switches configured to provide a cross, split or bar operation according to the splitting ratio.

Some embodiments relate to a method of providing optical signals to an optical I/O interface. The method includes using a laser device to provide at least one laser signal at a laser interface to an optical interface device, receiving first optical signals on a number N of first fibers coupled to a first optical interface of the laser device, and providing the first optical signals to the optical I/O interface on number M of second fibers. The first optical signals are provided using the at least one laser signal, and the number M is less than the number N. The method also includes receiving second optical signals at the optical I/O interface and providing the second optical signals on the number N of third fibers coupled to a second optical interface of the laser device.

In some embodiments, the method also includes providing a splitting ratio for splitting the at least one laser signal from the laser device to the optical interface device or providing information from the laser device to the optical interface device so that the splitting ratio can be determined by the optical interface device. In some embodiments, the method also includes splitting at least one laser signal according to the splitting ratio. In some embodiments, the laser interface is coupled to fourth fibers, the fourth fibers being greater than equal to N/R and less than or equal to the number N, where a number R is the splitting ratio. In some embodiments, the at least one laser is Q number of lasers, where Q equals N/R. The optical interface device is a Silicon Photonics (SiPh) optical engine electrically coupled to a network switch.

Figure 1:
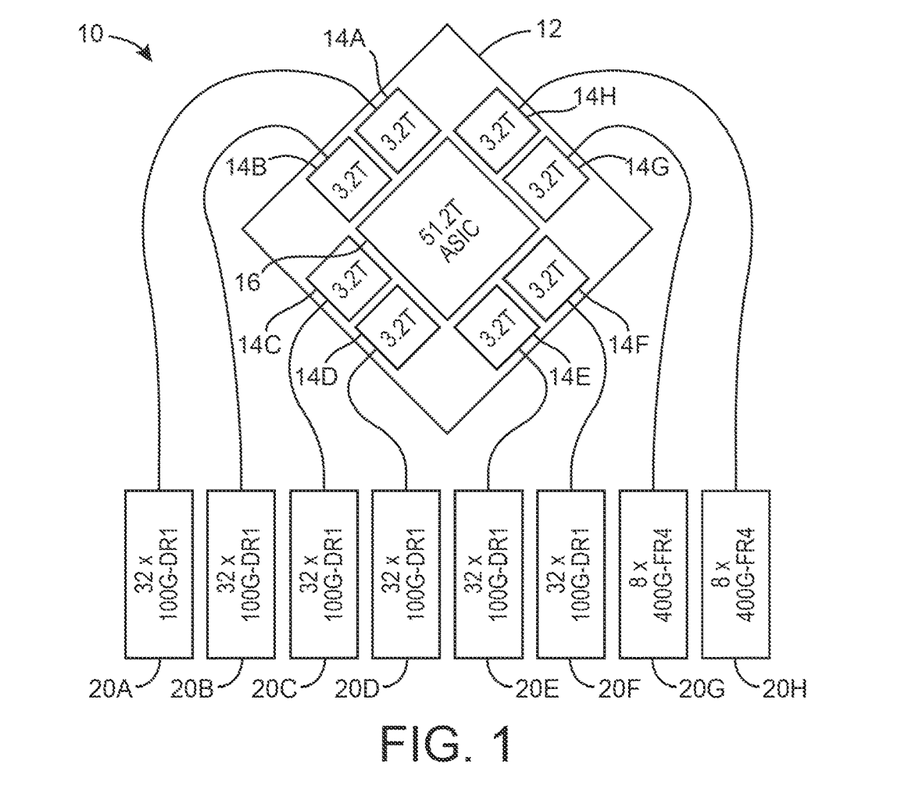
FIG. 1 is a general block diagram of a switch system including a number of optical interface devices and a number of laser devices in accordance with some exemplary embodiments.

With reference to FIG. 1, a system 10 includes a switch unit 12 and laser devices 20A-H and is for operation in a network. Switch unit 12 includes switch circuit 16 and optical interface devices 14A-H. Each of optical interface devices 14A-H is optically coupled with a respective laser device of laser devices 20A-H. System 10 can include any number of laser devices 20A-H and optical interface devices 14A-H. System 10 is any type of communication device that processes electronic and optical signals including but not limited to: a server, leaf, spine, router and/or transport switch and can be part of a data center. In some embodiments, system 10 is any computer networking, storage networking, and/or communications device or communication node. System 10 communicates with other node or devices using optical signals provided and received using optical interface devices 14A-H.

System 10 can be for operations in a variety of networks including IEEE Ethernet standard networks. The following IEEE Ethernet standard, including any draft versions of such standard, are hereby incorporated herein by reference in their entirety and are made part of the present disclosure for all purposes: IEEE 802.3. In addition, although this disclosure may reference aspects of these standard(s), the disclosure is in no way limited by these standard(s). Some standards may relate to storage area networks (SANs) for connecting computer data storage to servers in commercial data centers. SANs can use a Fibre Channel (FC) standard/protocol, small computer system interface (SCSI) interface standard/protocol, asynchronous transfer mode (ATM) protocol, and synchronous optical networking protocol (SONET), all of which are incorporated herein by reference in their entireties.

Optical interface devices 14A-H are configured as generic switch interfaces that support all of the interface types associated with laser devices 20A-H in some embodiments. Optical interface devices 14A-H are electrically coupled to a switch circuit 16 embodied as an ASIC. In some embodiments, optical interface devices 14A-H are co-packaged optical interfaces (CPOs) included with the switch circuit 16. CPOs are optical interfaces that are integrated with an electronic IC such as switch circuit 16. CPOs are provided in the same package or housing as switch circuit 16 and cannot be easily removed from the switch circuit 16 for replacement or repair in some embodiments. In some embodiments, the optical interface devices 14A-H are physically separate from switch circuit 16. In some embodiments, switch circuit 16 is 51.2 Terabit per second Ethernet switch. An optical interface device may refer to any device that receives optical signals and provides electric signals. In some embodiments, an optical interface device receives unmodulated laser signals, uses the laser signals to modulate and provide first optical signals in response to electronic signals from a processor (e.g., a switch circuit), and receives second optical signals (e.g., modulated optical signals) and provides electronic signals to the processor in response to the second optical signals.

Laser devices 20A-F are each configured to provide 32×100G DR1 single-wavelength optical interfaces, and laser devices 20G-H are each configured to provide 8 400G-FR4 four-wavelength optical interfaces in some embodiments. Laser devices 20A-G are provided in a laser module (e.g. a RML) which can be packaged in a multichip module in some embodiments. Laser devices 20A-G can each include more than one laser (e.g., Q number of lasers or sources of light). A laser device may refer to any device that includes at least one laser or other light source that provides at least one light signal suitable for optical communication (e.g., high speed optical communication (1 Gigabit per second or above)). In some embodiments, the light signal is a laser signal or other optical signal suitable for optical communication. A remote laser device may refer to a remote device that is separate or separable from the optical interface device and includes at least one laser in some embodiments. A laser module may refer to any device that includes a laser device housed or contained in a mechanical structure. The laser module is a packaged device configured to provide laser light in some embodiments. In some embodiments, the laser module includes heat dissipating components (e.g., heat sinks, Peltier assemblies, etc.), optical components, optical connectors, and electrical components. The laser module can be a remote laser module. A remote laser module may refer to a laser module that is separate from an optical interface device. A remote laser module (RLM) includes a type of remote laser device in some embodiments. A remote laser module includes a remote laser device that contained within a package or housing in some embodiments. The remote laser device can be replaceable without replacing the optical interface device in some embodiments. The remote laser device or RLM can be pluggable in some embodiments.

Pluggable refers to a characteristic where a device can be easily attached or removed using a connector or other interface. A pluggable interface may refer to an interface that includes electrical and optical connectors that can be easily attached or removed to another interface or may refer to an interface that is configured to receive connectors that can be easily attached or removed. Easily attached or removed may refer to a condition where the attachment or removal is consistent with the use of the interface or where attachment and removal can be achieved by an end user without the harming the interface or associated devices. For example, any interface that uses a connector that can be removed and inserted into the interface is a pluggable interface. A connector is a pluggable interface in some embodiments. In some embodiments, an RLM has a pluggable interface that is pluggable to the optical interface device and directly plugs into the optical interface device such that the housings of both devices are in contact. In some embodiments, an RLM has a pluggable interface that is pluggable to the optical interface device via a fiber optic cable of any length that is attached or attachable to the optical interface device. For example, the RLM and the optical interface device can be pluggable via a pluggable interface even though there is a distance between the RLM and the device. A connector may refer to any device that couples or connects two or more parts of an optical system and/or an electric circuit. In some embodiments, laser devices 20A-H are provided in a small form factor pluggable (SFF) package.

Figure 2:
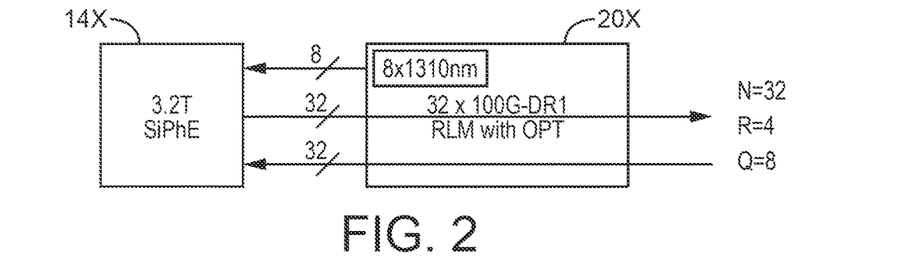
FIG. 2 is a general block diagram of one optical interface device coupled to one laser device for the switch system illustrated in FIG. 1 in accordance with some exemplary embodiments.

With reference to FIG. 2, an optical interface device 14X is coupled with laser device 20X. Laser device 20X can be any of laser devices 20A-E and optical interface device 14X is any of optical interface devices 14A-H. Laser device 20X is configured such that N equals 32, R equals 4 and is a fixed number, P equals 1, and Q equals 8 in some embodiments. Laser device 20X is configured for OPT in some embodiments. Optical interface device 14X is coupled with laser device 20X by optical fibers 22A (e.g., 8 internal fibers), by optical fibers 22B (e.g., 32 internal fibers), and by optical fibers 22C (e.g., 32 internal optical fibers). Optical fibers 22A-C are part of one or more fiber optic cables in some embodiments. Internal optical fibers may refer to fibers that are within system 10 and external optical fibers may refer to optical fibers that connect to a device outside of system 10.

Optical fibers 22A provide a laser path for laser light from laser device 20X to optical interface device 14X. The laser light can be provided by eight lasers at a single wave length from laser device 20X, each laser providing light on a single fiber of fibers 22A (e.g., at 1310 nm wavelength). Optical fibers 22B provide a transmit path for laser light from optical interface device 14X for reception by other devices in the network. Each fiber 22B is associated with a transmit channel in some embodiments. The transmit path for fibers 22B is provided through laser device 20X in some embodiments. Optical fibers 22C provide a receive path for laser light transmitted by other devices in the network for reception by optical interface device 14X. Each fiber 22B is associated with a receive channel in some embodiments. The receive path for fibers 22B is provided through laser device 20X in some embodiments.

Figure 3:
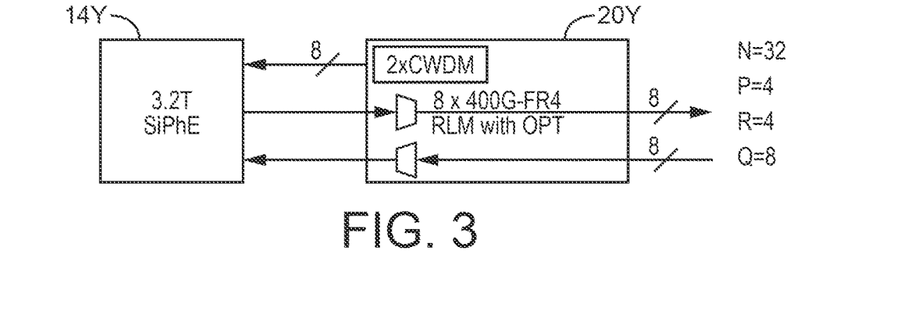
FIG. 3 is a general block diagram of one optical interface device coupled to one laser device for the switch system illustrated in FIG. 1 in accordance with some exemplary embodiments.

With reference to FIG. 3, an optical interface device 14Y is coupled with laser device 20Y. Laser device 20Y can be any of laser devices 12F-G and optical interface device 14Y is any of optical interface devices 14G-H. Laser device 20Y is configured such that N equals 32, R equals 4 and is a fixed number, P=4, and Q equals 8. Laser device 20Y is configured for coarse wavelength division multiplexing (CWDM) in some embodiments. Optical interface device 14Y is coupled with laser device 20Y by optical fibers 22A (e.g., 8 internal fibers), by optical fibers 22B (e.g., 32 internal fibers), and by optical fibers 22C (e.g., 32 internal optical fibers) similar to fibers 22A-C discussed with reference to FIG. 2. Optical interface devices 14Y and 14X can be identical and support both laser device 20X and 20Y in some embodiments.

Figure 4:
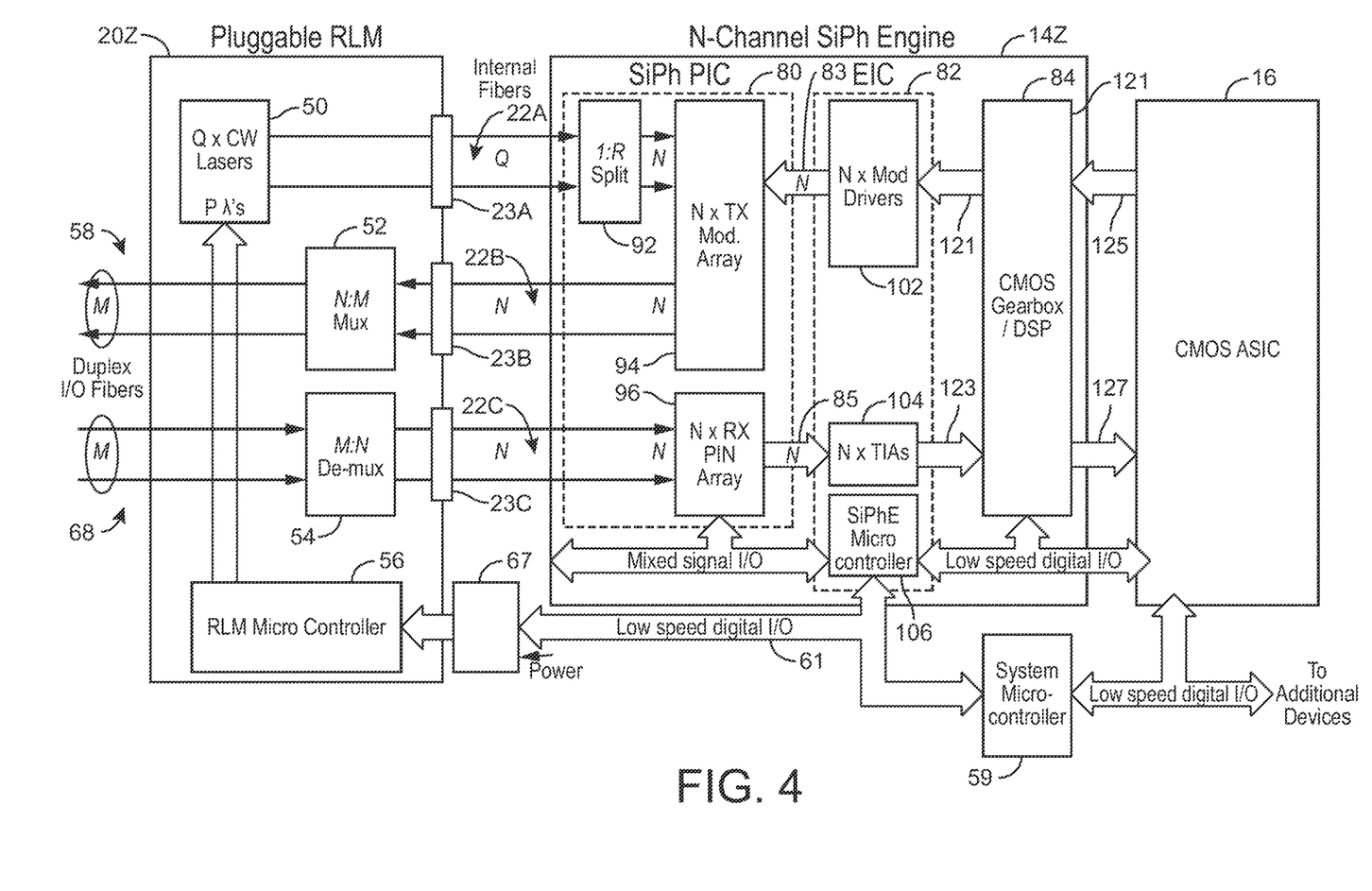
FIG. 4 is a more detailed block diagram of a portion of the switch system illustrated in FIG. 1 showing one optical interface device coupled to one laser device in accordance with some exemplary embodiments.

With reference to FIG. 4, an optical interface device 14Z is coupled with laser device 20Z. Laser device 20Z can be any of laser devices 20A-H and optical interface device 14Z is any of optical interface devices 14A-H (FIG. 1). Laser device 20Z is configured such that N equals 32, R equals 4 and is a fixed number, P equals 1 to 4, and Q equals 8 in some embodiments. Laser device 20X is configured for OPT or CWDM in some embodiments. Optical interface device 14Z is coupled with laser device 20Z by optical fibers 22A (e.g., 8 internal fibers), by optical fibers 22B (e.g., 32 internal fibers), and by optical fibers 22C (e.g., 32 internal optical fibers) similar to fibers 22A-C discussed with reference to FIG. 2. Laser device 20Z includes a transmission output 58 and reception input 68 for coupling to an I/O path in the network (e.g., remote from or external to system 10).

In some embodiments, laser device 20Z includes an optical interface 23A for coupling with fibers 22A (e.g., a laser or light interface), an optical interface 23B for coupling with fibers 22B (e.g., a transmit interface), and an optical interface 23C for coupling with fibers 22C (e.g., a receive interface). In some embodiments, a single pluggable connector associated with fibers 22A-C connects to interfaces 23A-C and a single pluggable connector connects to transmission output 58 and reception input 68 for the I/O path (e.g., an external I/O path). The external I/O path can include a single set of duplex optical I/O fibers for transmission and reception In some embodiments, separate pluggable connectors associated with fibers 22A-C connect to interfaces 23A-C and separate pluggable connectors connects to transmission output 58 and reception input 68 for the I/O path (e.g., external I/O path). Interfaces 23A-C can be considered an internal interface (e.g., an interface for connection to a device part of or internal to system 10, and transmission output 58 and reception input 68 can be considered an external interface (e.g., an interface for connection to a device remote from or external to system 10). The external interface and the internal interface can have identical formats in some embodiments. In some embodiments, the external interface and the internal interface have different formats. The connectors can be duplex or simplex connectors.

In some embodiments, laser device 20Z includes optical interface 23A configured for a 32×100 GB/s SiPhE that includes a combination of an interface for sixteen (16) 100G-DR1 single-wavelength and an interface for four (4) 400G-FR4 WDM. With a power split ratio of 4 (R=4), this combination is accomplished with a mix of 4 1310 nm CW lasers for the 100G-DR1 interfaces and 4 CWDM CW lasers for the 400G-FR4 interfaces in some embodiments. In some embodiments, laser device 20Z is modulation format and signal rate agnostic and can support multiple line rates and distances if the lines and distances are supported by switch circuit 16 and optical interface device 14Z. For example, the same laser device 20Z could be used for 400G-LR4-10 (4×100G, 10 km), 400G-FR4 (4×100 GB/s, 2 km) and 200G-FR4 (4×50 GB/s, 2 km) since the wavelengths are the same. Laser device 20Z adjusts the laser power to the level appropriate for the optical interface device, or optical attenuators within laser device 20Z or within optical interface device 14Z can be used to adjust the power of the laser light.

In some embodiments, laser device 20Z is configured as an optical-electrical-optical (OEO) media converter or WDM transponder or wavelength converter. Laser device 20Z can include components to convert optical signals to electrical signals and back to optical signals to perform wavelength conversion in the I/O path (e.g., between fibers 22B and output 58 or between fibers 22C and input 68). In some embodiments, laser device 20Z provides translation between different wavelength plans, line rates and modulation formats including but not limited to translation between a 400G-ER4 (LAN-WDM) format to 400G-LR4 (CWDM) format, a 400G-FR4 (CWDM) format to 400G-DR4 (1310 nm) format, a 100G CWDM4 (4×25GNRZ) format to a 100G-DR1 (100G PAM4), and a 4×100GPAM4 format to 400ZR coherent format.

Laser device 20Z includes a set of lasers 50 (e.g., numbering Q) providing light at P different wavelengths, a multiplexer 52 coupled to fibers 22B, a demultiplexer 54 coupled to fibers 22C, and a controller 56. Laser device 20Z includes transmission output 58 for providing signals from multiplexer 52 for reception by other devices in the network and reception input 68 of providing signals to multiplexer 52 from other devices in the network. Transmission output 58 and reception input 68 are coupled to duplex input/output optical fibers (e.g. M fibers) in some embodiments. M is any integer associated with the number of I/O fibers. Transmission output 58 and reception input 68 can be coupled to respective sets of simplex input/output optical fibers (e.g., M fibers in each set) in some embodiments.

Multiplexer 52 is an N:M optical multiplexer in some embodiments. Multiplexer 52 multiplexes the signals on N optical fibers 22B for provision on M optical fibers at output 58. Demultiplexer 54 is an M:N optical demultiplexer in some embodiments. Demultiplexer 54 demultiplexes the signals on M optical fibers at input 68 for provision on N optical fibers 22C. Multiplexer 52 is any device that that combines optical signals for transporting over a fewer fibers. Demultiplexer 54 is any device that separates optical signals for provision on more fibers. Any type of multiplexing and demultiplexing (e.g., time division multiplexing/demultiplexing, wavelength division multiplexing/demultiplexing, coarse wavelength division multiplexing/demultiplexing, dense wavelength division multiplexing/demultiplexing) can be used. In some embodiments, multiplexer 52 includes one or more of thin film filters, fiber Bragg gratings with optical circulators, free space grating devices, integrated planar arrayed waveguide gratings, manual fiber patch panel, microelectromechanical systems (MEMS), liquid crystal switches in planar waveguide circuits, and thermo-optic switches in planar waveguide circuits. In some embodiments, demultiplexer 54 includes one or more prisms, diffraction gratings, spectral (frequency) filters, tunable detectors, diffraction gratings, arrayed waveguide gratings, acousto-optical filter, spectral filters, microelectromechanical systems (MEMS), liquid crystal switches in planar waveguide circuits, and thermo-optic switches in planar waveguide circuits.

Lasers 50 are any type of light sources used for optical communication, such as, any type of laser for use in fiber optic communication. The light can be provided at one or more wavelengths (e.g., 850 nm, 1310 nm, 1550 nm) and can be produced by a process of optical amplification based on the stimulated emission of electromagnetic radiation. Lasers 50 are vertical cavity surface-emitting laser (VCSEL), Fabry-Perot (FP) lasers, distributed feedback (DFB) lasers, mode-locked lasers and/or comb-frequency lasers in some embodiments. Lasers 50, multiplexer 52 and demultiplexer 54 are integrated in a single IC package (e.g., a single chip IC package or multi-chip IC package) in some embodiments. Lasers 50, controller 56, multiplexer 52 and demultiplexer 54 are integrated in a single package in some embodiments.

The controller 56 is a component that processes data and controls operation of lasers 50. Controller 56 can configure laser device 20Z for different operational configurations. Controller 56 receives data from optical interface device 14Z or system micro controller 59 via bus 61. The data can indicate a configuration of laser device 20Z for use by optical interface device 14Z and a configuration of optical interface device 14Z for use by laser device 20Z. In some embodiments, controller 56 stores a list of all supported interfaces in memory. Bus 61 is a low speed digital I/O bus in some embodiments. The controller 56 may be embodied as FPGA, ASIC, a logic circuit, digital signal processor, microcontroller, etc. The controller 56 may obtain instructions from a memory or storage device.

In some embodiments, the laser device 20Z as controlled by controller 56 serves as master device to the optical interface device 14Z which serves as a slave device. The optical interface device 14Z remains in a low-power mode until laser device 20Z is connected or plugged into optical interface device 14Z. Once laser device 20Z plugged in or connected to optical interface device 14Z, laser device 20Z wakes up the optical interface device 14Z and provides a command via bus 61 to the optical interface device 14Z. The command causes optical interface device 14Z to begin configuring to the appropriate interface mode to match laser device 20Z in some embodiments.

In some embodiments, laser device 20Z includes additional passive optical elements in the I/O path (e.g., between fibers 22B and output 58 or between fibers 22C and input 68). Example passive optical elements include but are not limited to wavelength or frequency interleavers and de-interleavers (e.g., to adapt DWDM grid spacing), optical power splitters and combiners (e.g., for point to multi-point transmission), optical attenuators (e.g., to enable connection of short reach and long reach interfaces), and/or dispersion compensators (e.g., to enable transmission over longer reaches). In some embodiments, laser device 20Z includes active optical elements in the I/O path (e.g., between fibers 22B and output 58 or between fibers 22c and input 68). The active optical elements can replaced or supplemented with the passive optical elements discussed above. Example active optical elements include but are not limited to optical switches and switch matrices, variable optical attenuators and power monitors, and/or optical amplifiers. The optical amplifiers can compensate for the losses of other optical elements.

Optical interface device 14Z is embodied as an N-Channel SiPhE and is coupled to switch circuit 16 in some embodiments. Optical interface device 14Z includes a photonic integrated circuit (PIC) 80, an electrical integrated circuit (EIC) 82, and a processor 84. PIC 80, EIC 82, and processor 84 are integrated in a single IC package (e.g., a single chip IC package or a multi-chip IC package) in some embodiments. PIC 80, EIC 82, switch circuit 16, and processor 84 are integrated in a single IC package (e.g., a multi-chip IC package) in some embodiments. PIC 80 is coupled to EIC 82 by receive conductors 85 and transmit conductors 83. EIC 82 is coupled to controller 56 and system controller 59 by bus 61. EIC 82 is coupled to processor 84 by transmit conductors 121 and receive conductors 123. Processor 84 is coupled to switch circuit 16 by transmit conductors 125 and receive conductors 127.

PIC 80 includes a splitting device 92 coupled to fibers 22A, a receive array 96 coupled to fibers 22C, and a transmit array 94 coupled to fibers 22B. PIC 80 is a SiPh PIC in some embodiments. In some embodiments, PIC 80 is compatible with CMOS (electronic) fabrication and is configured to process optical signals between EIC 82 and laser device 20Z. In some embodiments, PIC 80 includes additional passive optical elements or active optical elements. For example, PIC 80 can include optical attenuators configured to adjust power of laser light received on fibers 22A.

Splitting device 92 is configured to split the optical signals provided on fibers 22A (e.g., Q laser signals) to provide N signals to transmit array 94. In some embodiments, splitting device 92 is configured to split the signal according to the splitting ratio R where N=QXR. R is the number of transmit channels per laser, and splitting device 92 is an 1:R splitting device in some embodiments. In some embodiments, splitting device 92 is a fixed splitting device (e.g., R is constant and non-configurable). In some embodiments, R is variable. Splitting device 92 may include one or more beam splitter in some embodiments. Splitting devices 92 can use planar waveguide splitters (e.g., multimode interference couplers, directional couplers, etc.) or partially reflective mediums (e.g., partially-silvered mirrors, dichroic mirrors, dichroic mirrored prisms, etc.) to effect beam splitting.

Receive array 96 receives optical signals on fibers 22C and provides electrical signals to conductors 85 to EIC 82. Conductors 85 are N conductors in some embodiments. Receive array 96 includes detectors for converting modulated optical signals to modulated electric signals. The detectors are an array of photodiodes (e.g., at least N positive-intrinsic-negative (PIN) photodiodes) in some embodiments.

Transmit array 94 receives optical signals on fibers 22A from laser device 20Z via splitting device 92 and provides modulated optical signals on fibers 22B for transmission. Transmit array 94 modulates the optical signals in accordance with electric modulation signals provided on conductors 83 by EIC 82. Transmitter array 94 can provide digital pulse code modulation, pulse amplitude modulation (e.g., PAM 4), non-return to zero (NRZ), etc. Conductors 83 are N conductors in some embodiments. Transmit array 94 includes an array of at least N optical modulators. The modulators can be amplitude modulators, phase modulators, polarization modulators, absorptive modulators, refractive modulators or a combination.

EIC 82 is an IC configured to communicate electric signals with PIC 80 on conductors 83 and 85. EIC 82 includes a modulation driver 102 for providing the electric modulation signals to transmit array 94 and a receive array 104 for receiving electric modulated signals associated with the optical signals received by receive array 96. In some embodiments, receive array 104 includes an array of transimpedance amplifiers (TIAs) configured to process the current signal of the electric modulated signals into a voltage signal of a certain amplitude. The voltage signal is provided to processor 84 which demodulates the voltage signal and provides the demodulated signal to switch circuit 16 via conductors 127. Processor 84 provides signals to control modulation via conductors 121. The switch circuit 16 provides signals for modulation via conductors 125.

Controller 106 is a component that processes data and controls operation of optical interface device 14Z. Controller 106 can control arrays 94, 96, and 104 and processor 84. Controller 106 receives data from laser device 20Z, system controller 59, and processor 84 via bus 61. Bus 61 is connected to an electrical connector 67 coupled to microcontroller 56. Electric power for module 20Z can be provided via connector 67. Connector 67 can be part of a pluggable interface associated with interfaces 23A-C in some embodiments. The data can indicate a configuration of laser device 20Z. The controller 106 may be embodied as FPGA, ASIC, a logic circuit, digital signal processor, microcontroller, etc. The controller 56 may obtain instructions from a memory or storage device. Processor 84 is any device that processes the communication data associated with conductors 121 and 123. Processor 84 may be embodied as an FPGA, an ASIC, a logic circuit, a digital signal processor, a microcontroller, etc. Processor 84 may obtain instructions from a memory or storage device. System controller 59 is a device that processes data and controls operation of the system associated with optical interface device 14Z. Controllers 59 and 106 can be embodied as embodied as an FPGA, an ASIC, a logic circuit, a digital signal processor, a microcontroller, etc. In some embodiments, modules 20J and/or 20Z communicate with a system microcontroller (e.g., system controller 59) that is external to the optical interface device 20Z rather than directly to controller 106. System microcontroller 59 is coupled to switch circuit 16 and to additional devices in the system via a digital I/O bus in some embodiments.

Figure 5:
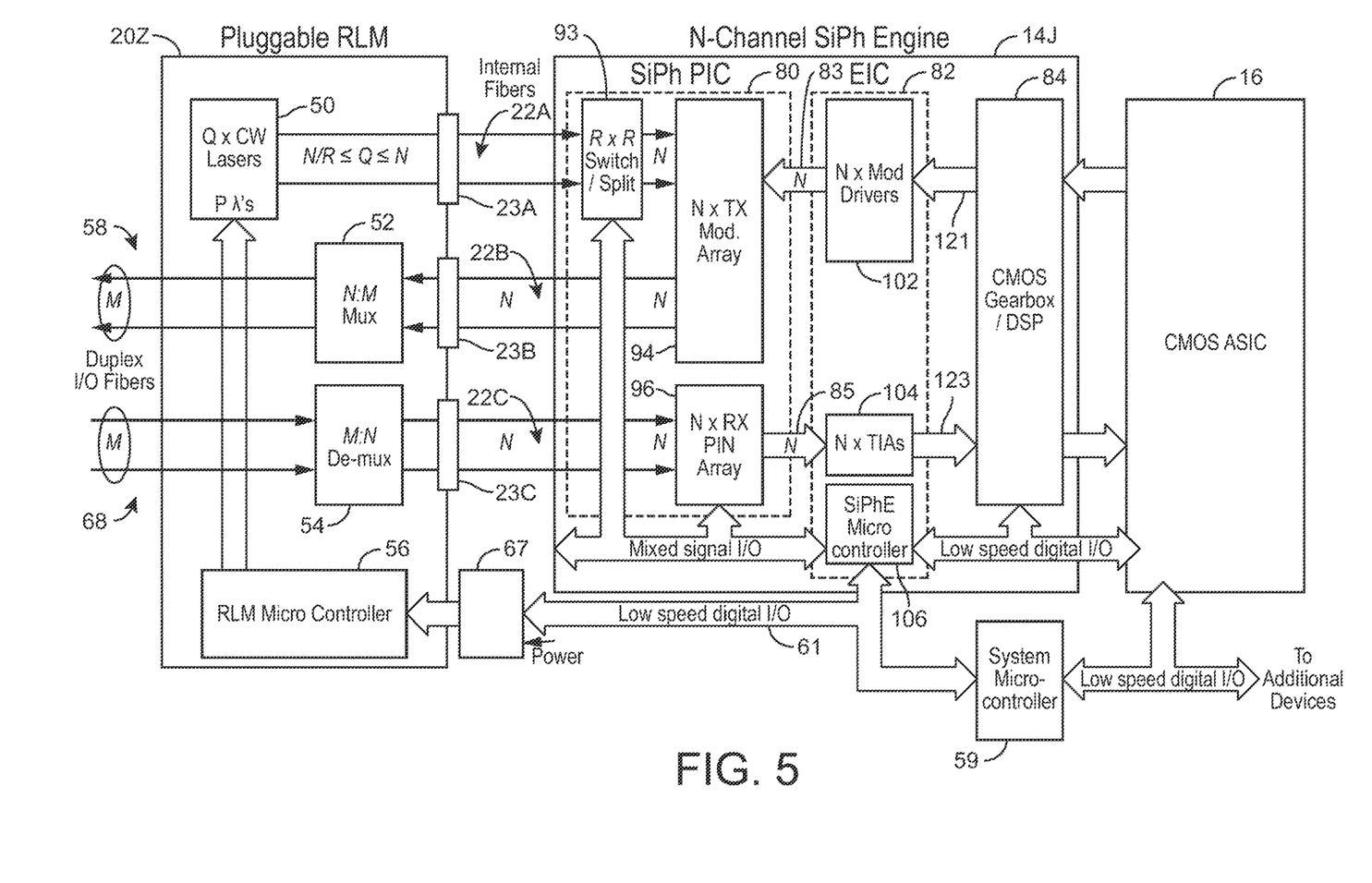
FIG. 5 is a more detailed block diagram of a portion of the switch system illustrated in FIG. 1 showing one optical interface device coupled to one laser device in accordance with some exemplary embodiments.

With reference to FIG. 5, an optical interface device 14J is coupled with laser device 20Z. Laser device 20Z can be any of laser devices A-H and optical interface device 14J is any of optical interface devices 14A-H (FIG. 1). Laser device 20Z is configured such that N equals 32, R is less than 5 and more than 1 and is a not fixed number, P equals 1 to 4, and Q equals 8 in some embodiments. In some embodiments laser device 20Z is configured such that N/R is less than or equal to Q which is less than or equal to N. Laser device 20Z is configured for OPT or CWDM in some embodiments.

Optical interface device 14J is embodied as an N-Channel SiPhE and is coupled to switch circuit 16 in some embodiments. The term SiPhE may refer to one or more integrated circuits that includes a photonic engine and electronics (e.g., electronics for a switch) packaged together using SiPh technology. Optical interface device 14J is similar to optical interface device 14Z in some embodiments. Optical interface device 14J includes PIC 80 which includes a splitting device 93 coupled to fibers 22A. Splitting device 93 is similar to splitting device 92 (FIG. 4). Splitting device 93 is configured to split the signals provided on fibers 22A (Q signals) to provide N signals to transmit array 94. In some embodiments, splitting device 92 is configured to split the signal according to the splitting ratio R where N=QXR. R is the number of transmit channels per laser in some embodiments. In some embodiments, splitting device 93 is an 1:R splitting device. In some embodiments, the configuration of splitting device 93 is controlled by signals from controller 106. Controller 106 can provide configuration signals based upon configuration information associated with laser device 20Z. A splitting ratio may refer to the ratio of the number input signals provided to the splitting devices 92 or 93 to the number of output signals provided by the splitting devices 92 or 93.

Figure 6:
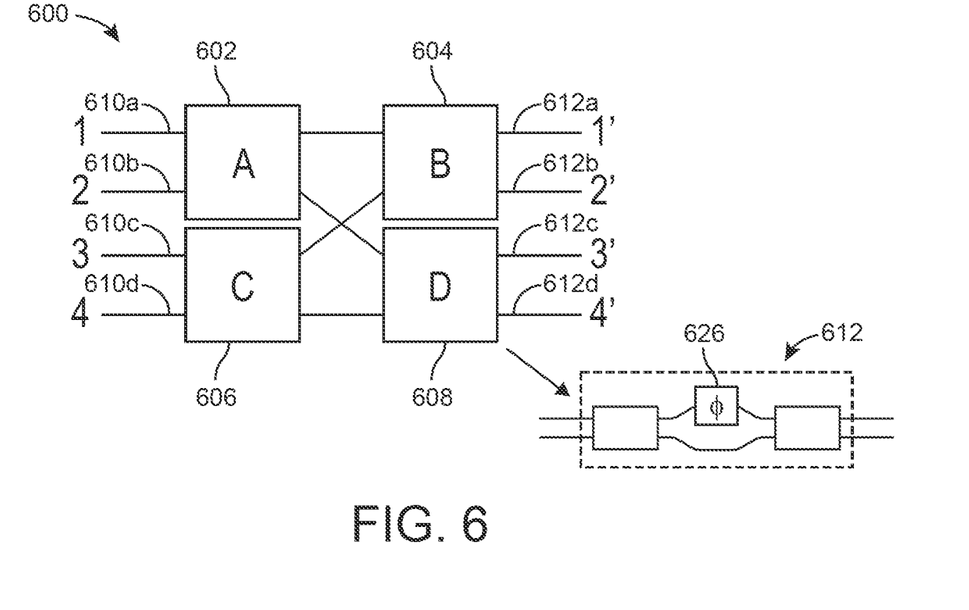
FIG. 6 is a block diagram of a power splitting device for one of the optical interface devices of the switch system illustrated in FIG. 1 in accordance with some exemplary embodiments.

With reference to FIG. 6, a splitting device 600 can be used as splitting devices 92 and 93. Splitting device 600 is configured as a programmable switch/split network in some embodiments. Splitting device 600 is configured as a two stage 4×4 splitter in some embodiments. Splitting device 600 includes inputs 610A-D and outputs 612A-D. Switches 602, 604, 606, and 608 are disposed between inputs 610A-D and outputs 612A-D and can be arranged in a matrix (e.g., 2×2, each switch 602, 604, 606, and 608 with 2 inputs and two outputs). Switches 602, 604, 606, and 608 operate to provide selectively a signal on one or more of inputs 610A-D to one or more of outputs 612A-D.

Figure 7:
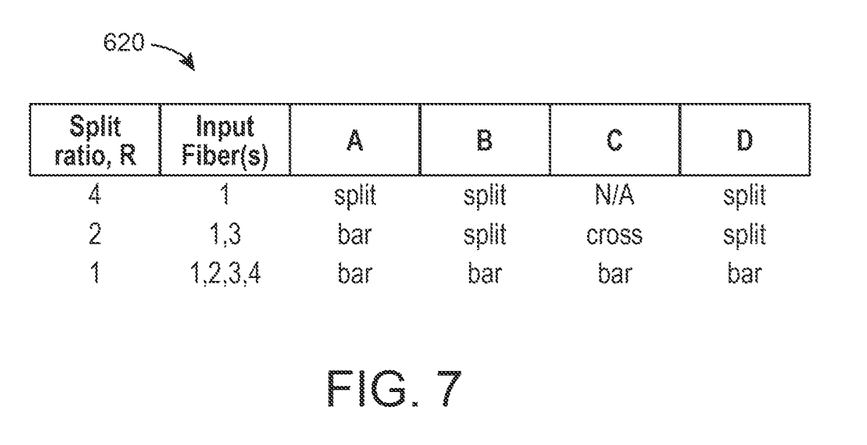
FIG. 7 is a table showing configurations of the power splitting device illustrated in FIG. 6 in accordance with some exemplary embodiments.

With reference to FIG. 7, table 620 provides configurations for switches for switches 602, 604, 606, and 608 to provide split ratios where R equals 1, 2, or 4. When R equals four, the signal on input 610a is provided to switches 604 and 608 (e.g., a split operation) and further provided from switches 604 and 608 (e.g., another split operation) for provision on all of outputs 612A-D. When R equals two, the signal on input 610A is provided by switch 602 to switch 604 (e.g., a bar operation) which provides the signal from switch 602 to outputs 612A-B (e.g., a split operation). When R equals two, the signal on input 610C is provided by switch 606 to switch 608 (e.g., a cross operation) which provides the signal from switch 606 for provision on outputs 612C-D (e.g., split operation). When R equals one, the signals on inputs 610A-D are provided by switches 602 and 606 to switches 604 and 608 (e.g., bar operations) which provide the signals to respective outputs 612A-D (e.g., bar operations).

A split operation splits the input signal on the first or the second input for provision on both outputs of the switch in some embodiments. The cross operation provides the signal at a first input of the switch to a second output of the switch without providing the signal to the first output of the switch in some embodiments. The bar operation provides the signal at the first input of the switch to the first output of the switch and the signal at the second input of the switch to the second output in some embodiments. The split bar, and cross operations are implemented by an appropriate bias to a phase section 626 in switch 612 which can be any of switches 602, 604, 606, and 608. The bias can be provided by controller 106 based upon data from controller 56. The data can be switch configuration data. Switches 602, 604, 606, and 608 are MZ switches in some embodiments. Splitting device 600 is provided for each group of four CW laser inputs in some embodiments. The term splits or splitting may refer to the dividing of a signal into two or more signals. A splitting device may refer to a device configured to receive a first number of input signals and provide a number of output signals according to a splitting ratio. The splitting device can use splitting to provide two or more output signals from one of the input signals.

Figure 8:
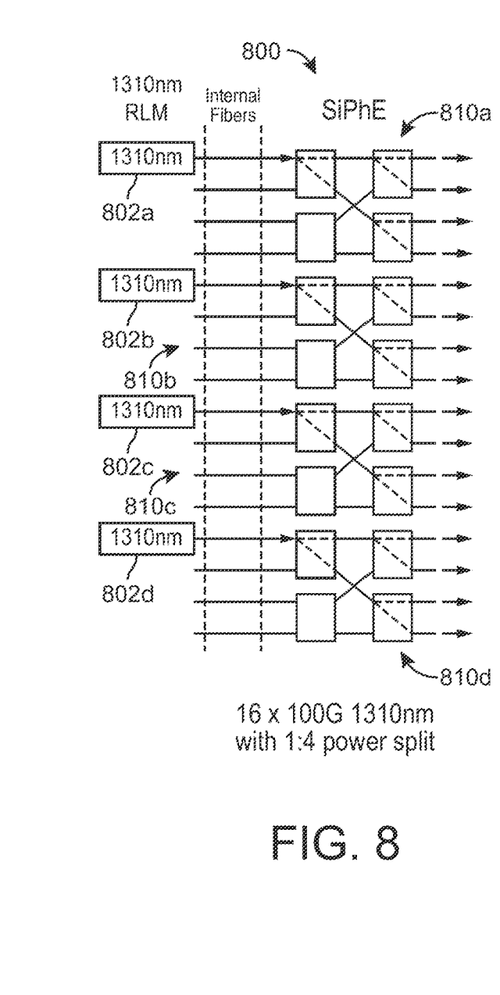
FIG. 8 is a general block diagram of optical paths for the switch system illustrated in FIG. 1 in a one to four power split configuration in accordance with some exemplary embodiments.

With reference to FIG. 8, a diagram 800 shows optical paths between a set of four lasers 802A-D. Lasers 802A-D can be part of laser device 20Z (FIG. 4) or laser device 20J (FIG. 5) in some embodiments. Lasers 802A-D are optically coupled with splitting devices 810A-D which can be used in splitting device 93 (FIG. 5). Lasers 802A-D are part of a remote laser module configured for 100 GB/S at a single wavelength 1310 nm operation where N is 16 and the power split ratio R is 4 or 1:4

Figure 9:
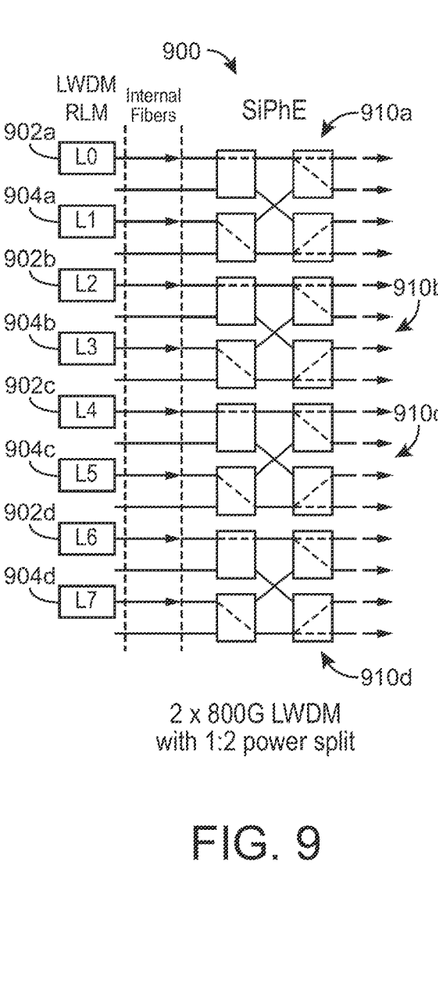
FIG. 9 is a general block diagram of optical paths for the switch system illustrated in FIG. 1 in a one to two power split configuration in accordance with some exemplary embodiments.

With reference to FIG. 9, a diagram 900 shows optical paths between a set of eight lasers (e.g., four lasers 902A-D and four lasers 904A-D. Lasers 902A-D and 904A-D can be part of laser device 20Z (FIG. 4) or 20J (FIG. 5) in some embodiments. Lasers 902A-D and 904A-D are optically coupled with splitting devices 910A-D which can be used in splitting device 93 (FIG. 5). Lasers 902A-D and 904A-D are part of a remote laser module configured for local area network WDM 800 gb/s operation at eight wavelengths L0 to L7 where N is 16 and the power split ratio R is 2 or 1:2.

Figure 10:
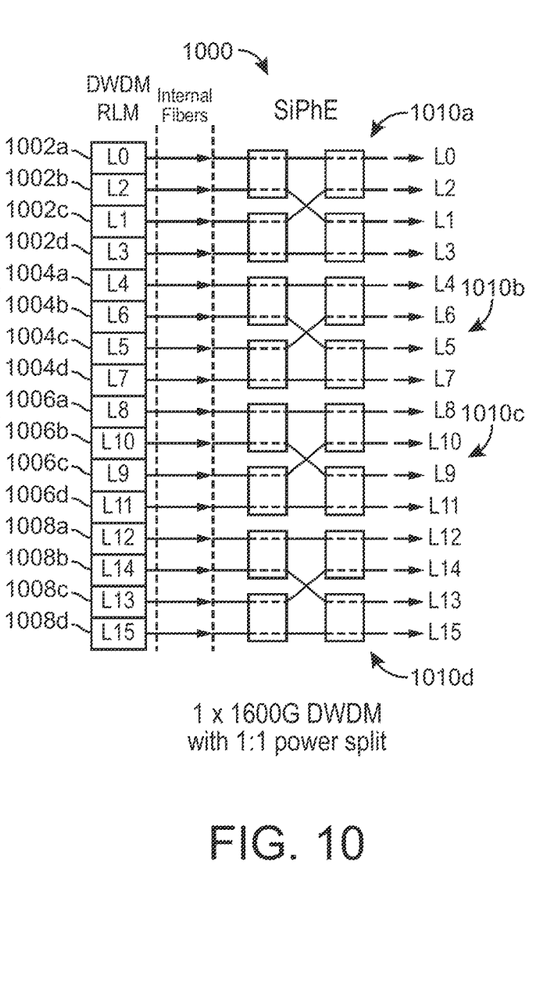
FIG. 10 is a general block diagram of optical paths for the switch system illustrated in FIG. 1 in a one to one power split configuration in accordance with some exemplary embodiments.

With reference to FIG. 10, a diagram 1000 shows optical paths between a set of sixteen lasers (.e., four lasers 1002A-D, four lasers 1004A-D, four lasers 1006A-D and four lasers 1008A-D). Lasers 1002A-D, 1004A-D 1006A-D and 1008A-D can be part of laser device 20Z (FIG. 4) or 20J (FIG. 5) in some embodiments. Lasers 1002A-D, 1004A-D 1006A-D and 1008A-D are optically coupled with splitting devices 1010A-D which can used as splitting device 93 (FIG. 5). Lasers 1002A-D, 1004A-D 1006A-D and 1008A-D are part of a remote laser module configured for dense WDM 1600 Gb/s operation at 16 wavelengths L0 to L15 where N is 16 and the power split ratio R is 1 or 1:1.

Figure 11:
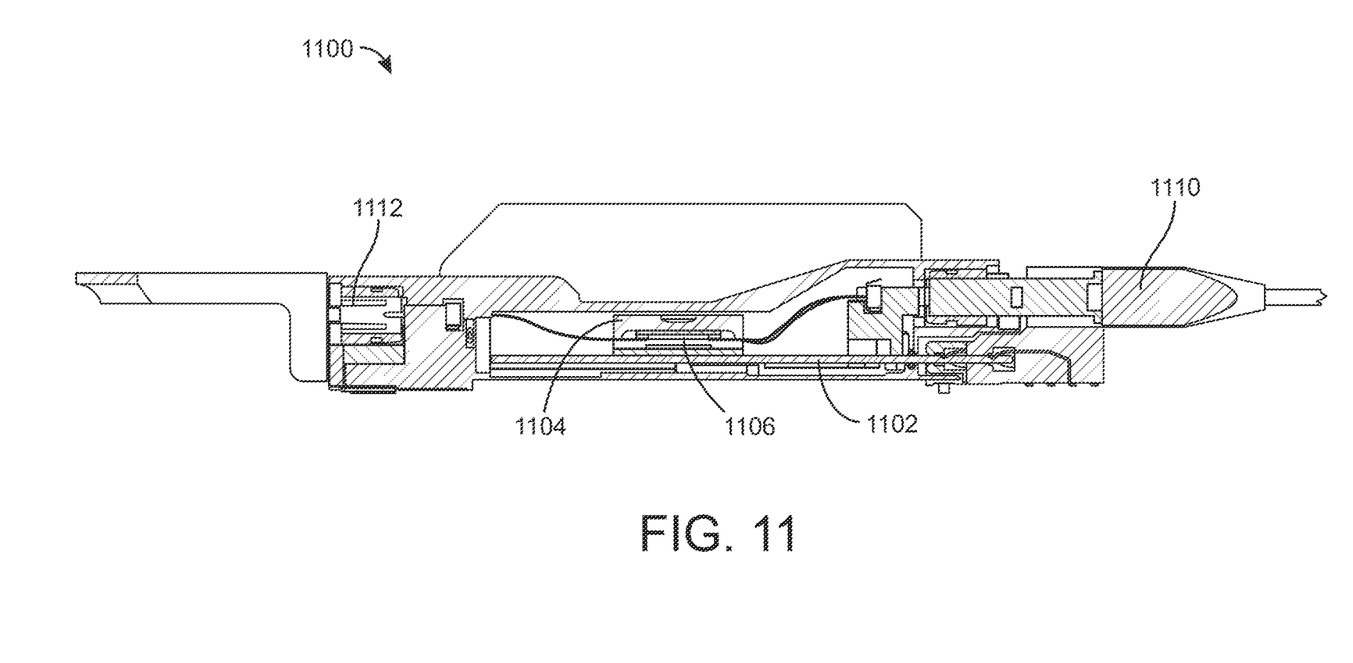
FIG. 11 is a schematic cross sectional view drawing of a remote laser module for the switch system illustrated in FIG. 1 according to some exemplary embodiments.

With reference to FIG. 11, a laser device 1100 can be used as laser devices 20Z. Laser device 1100 is included in a pluggable remote laser module or package. Laser device 1100 includes a circuit board 1102 (e.g., ceramic, fiber glass, or other substrate) and an optical IC package 1104 including the lasers and an optical IC 1106 with planar multiplexer and demultiplexer devices (e.g., multiplexer 52 and demultiplexer 54 (FIGS. 4 and 5)). The optical multiplexer 52 and demultiplexer 54 can be manufactured in multiplexer and demultiplexer chips using planar light guide circuit (PLC) arrayed waveguide grating (AWG) technology, thin film filter (TFF) technology, or silicon photonics PIC technology. PLC technology and SiPh PIC technology can be used for multiplexer and demultiplexer chips providing laser light at more than four wavelengths and with higher channel counts in some embodiments. Circuit board 1102 includes one or more integrated circuits and discrete electrical components including circuitry for power and control of the optical devices in laser device 1100, as well as communication with the optical interface device 14Z and system controller 59 over digital I/O bus 61. Laser device 1100 includes an external I/O connector 1112 (e.g., for input 68 and output 58) and internal I/O connector 1110 for fibers 22A-C (FIGS. 4-5). External and internal fiber arrays (e.g., fibers for input 68 and output 58 and fibers 22A-C) for respective I/O connector 1112 and internal I/O connector 1110 can be attached directly to the facets of the IC 1106, resulting in very low insertion loss. IC 1106 can be a PIC and/or a PLC (e.g., containing multiplexer 52 and demultiplexer 54). The PLC or PIC can contain I/O tapers to match waveguide mode size to the fibers in some embodiments. Multiplexer 52 and demultiplexer 54 can be integrated on the same chip or multiple chips as required for ease of manufacturability.

It should be noted that certain passages of this disclosure may reference terms such as "first" and "second" in connection with devices, fibers, paths, input, outputs etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

Any references to embodiments or elements or acts of the systems and methods herein referred to in the singular can also embrace embodiments including a plurality of these elements, and any references in plural to any implementation or element or act herein can also embrace embodiments including only a single element. References in the singular or plural form are not intended to limit the presently disclosed systems or methods, their components, acts, or elements to single or plural configurations. References to any act or element being based on any information, act or element can include embodiments where the act or element is based at least in part on any information, act, or element.

Any implementation disclosed herein can be combined with any other implementation, and references to "an implementation," "some embodiments," "an alternate implementation," "various implementation," "one implementation" or the like are not necessarily mutually exclusive and are intended to indicate that a particular feature, structure, or characteristic described in connection with the implementation can be included in at least one implementation. Such terms as used herein are not necessarily all referring to the same implementation. Any implementation can be combined with any other implementation, inclusively or exclusively, in any manner consistent with the aspects and embodiments disclosed herein. In the above description, for the purposes of explanation, numerous details are set forth to provide a thorough understanding of the described embodiments. It will be apparent to one skilled in the art, however, that other embodiments may be practiced without some of these details. In other instances, structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Furthermore, the methods and processes discussed herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The systems may be implemented in many different ways and in many different combinations of hardware, optical, and software and circuit designs. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components, optical components or any combination thereof.

The optical and electronic circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples. The integrated circuit package can be a combination of two or more packages in some embodiments.

The circuitry may further include or access instructions (e.g., software or firmware) for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

Various implementations have been specifically described. However, many other implementations are also possible.

We claim:

1. A device, comprising:
one or more lasers;
a first optical interface for one or more network devices;
a second optical interface for an engine device;
a third optical interface for the engine device;
one or more first optical devices disposed between the first optical interface and the third optical interface; and
one or more second optical devices disposed between the first optical interface and the second optical interface, wherein the one or more lasers are configured to provide first optical signals to a fourth optical interface for reception by the engine device.

2. The device of claim 1, further comprising:
a controller coupled to the one or more lasers via an electronic bus, the controller configured to configure the one or more lasers, wherein the one or more first optical devices comprises a multiplexer and the one or more second optical devices comprises a demultiplexer.

3. The device of claim 2, wherein the controller is configured to provide a wakeup signal to the engine device when the one or more lasers receive power.

4. The device of claim 3, wherein a number of the one or more lasers is less than or equal to a number of optical fibers associated with the third optical interface.

5. The device of claim 4, wherein the multiplexer and demultiplexer are disposed on one or more planar integrated circuits.

6. The device of claim 1, wherein the first optical interface comprises an optical I/O interface, the second optical interface comprises an optical receive interface, and the third optical interface is an optical transmit interface, wherein the optical I/O interface comprises a pluggable interface.

7. The device of claim 1, wherein the first optical interface comprises an optical I/O interface, the second optical interface comprises an optical receive interface, and the third optical interface is an optical transmit interface, wherein the optical receive interface and the optical transmit interface comprise pluggable interfaces.

8. The device of claim 1, wherein the first optical interface comprises an optical I/O interface, the second optical interface comprises an optical receive interface, and the third optical interface comprises an optical transmit interface, wherein the optical receive interface and the optical transmit interface are configured for attachment to a single connector.

9. A system, comprising:
a laser device comprising an optical I/O interface, a first optical interface, a second optical interface, an optical multiplexer disposed between the optical I/O interface and the first optical interface, and an optical demultiplexer disposed between the optical I/O interface and the second optical interface; and
an optical interface device configured to be optically coupled with the laser device, wherein the optical interface device is configured to provide first optical signals via first fibers coupled to the first optical interface and the laser device is configured to provide the first optical signals to the optical I/O interface using the optical multiplexer and wherein the laser device is configured to provide second optical signals from the optical I/O interface to second fibers coupled to the second optical interface using the optical demultiplexer.

10. The system of claim 9, wherein the laser device is configured to split the second optical signals on the optical I/O interface.

11. The system of claim 9, wherein the optical interface device comprises a Silicon Photonics (SiPh) optical engine.

12. The system of claim 9, wherein the optical interface device comprises a splitting device and the laser device comprises a laser interface and at least one laser, wherein a number Q of third fibers are coupled between the splitting device and the laser device, wherein the number Q is a number of the at least one laser disposed in the laser device.

13. The system of claim 12, wherein the splitting device is configured to split laser signals provided on third fibers by the laser device in response to a splitting ratio, where the splitting ratio is the number N divided by the number Q, where the number N represents the number of first fibers.

14. The system of claim 9, wherein the optical interface device comprises a splitting device and the laser device comprises a laser interface and at least one laser, wherein third fibers are coupled between the splitting device and the laser interface, wherein the splitting device is configured to split laser signals on the third fibers using a splitting ratio, the splitting ratio being a variable integer.

15. The system of claim 14, wherein the splitting device comprises 2×2 switches configured to provide a cross, split or bar operation in response to the splitting ratio.

16. A method of providing optical signals to an optical I/O interface, the method comprising:
using a laser device to provide at least one light signal to an optical interface device;
receiving first optical signals on a number N of first fibers coupled to a first optical interface of the laser device from the optical interface device, the first optical signals being provided using the at least one light signal;
providing the first optical signals to the optical I/O interface on a number M of second fibers, where the number M is less than the number N;
receiving second optical signals at the optical/O interface; and
providing the second optical signals to a second optical interface of the laser device, the second optical interface being coupled to the optical interface device.

17. The method of claim 16, further comprising:
providing a splitting ratio for splitting the at least one light signal from the laser device to the optical interface device or providing information from the laser device to the optical interface device so that the splitting ratio can be determined by the optical interface device.

18. The method of claim 17, further comprising:
splitting at least one light signal according to the splitting ratio.

19. The method of claim 18, wherein the at least one light signal is provided on a laser interface coupled to third fibers, the third fibers being a number greater than equal to the number N divided by a number R and less than or equal to the number N, where the number R represents the splitting ratio.

20. The method of claim 19, wherein the laser device comprises a number Q of lasers, where the number Q equals the number N divided by the number R and wherein the optical interface device is a Silicon Photonics (SiPh) engine.

* * * * *